United States Patent

Mirkin

(10) Patent No.: US 9,442,922 B2
(45) Date of Patent: Sep. 13, 2016

(54) SYSTEM AND METHOD FOR INCREMENTALLY UPDATING A REORDERING MODEL FOR A STATISTICAL MACHINE TRANSLATION SYSTEM

(71) Applicant: Xerox Corporation, Norwalk, CT (US)

(72) Inventor: Shachar Mirkin, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 17 days.

(21) Appl. No.: 14/546,424

(22) Filed: Nov. 18, 2014

(65) Prior Publication Data

US 2016/0140111 A1 May 19, 2016

(51) Int. Cl.
G06F 17/28 (2006.01)

(52) U.S. Cl.
CPC .................................. *G06F 17/289* (2013.01)

(58) Field of Classification Search
CPC ............... G06F 17/28; G06F 17/2809; G06F 17/2818; G06F 17/2827; G06F 17/289
USPC ............................................. 704/2, 3, 4, 277
See application file for complete search history.

(56) References Cited

U.S. PATENT DOCUMENTS

| 7,113,903 | B1* | 9/2006 | Riccardi | G06F 17/2775 |
| | | | | 704/2 |
| 8,452,585 | B2* | 5/2013 | Toutanova | G06F 17/2818 |
| | | | | 704/10 |
| 8,543,563 | B1 | 9/2013 | Nikoulina et al. | |
| 8,612,204 | B1* | 12/2013 | Uszkoreit | G06F 17/2818 |
| | | | | 704/2 |
| 2004/0024581 | A1* | 2/2004 | Koehn | G06F 17/271 |
| | | | | 704/2 |
| 2006/0111891 | A1* | 5/2006 | Menezes | G06F 17/2818 |
| | | | | 704/3 |
| 2008/0306725 | A1* | 12/2008 | Moore | G06F 17/2818 |
| | | | | 704/2 |
| 2009/0106015 | A1* | 4/2009 | Li | G06F 17/2818 |
| | | | | 704/2 |
| 2009/0271177 | A1* | 10/2009 | Menezes | G06F 17/2818 |
| | | | | 704/2 |
| 2009/0326912 | A1* | 12/2009 | Ueffing | G06F 17/2818 |
| | | | | 704/2 |
| 2010/0070521 | A1 | 3/2010 | Clinchant et al. | |
| 2010/0256973 | A1* | 10/2010 | Chen | G06F 17/2818 |
| | | | | 704/4 |
| 2012/0016657 | A1* | 1/2012 | He | G06F 17/2836 |
| | | | | 704/2 |
| 2012/0022850 | A1* | 1/2012 | Li | G06F 17/2818 |
| | | | | 704/2 |
| 2012/0143591 | A1* | 6/2012 | Deng | G06F 17/2818 |
| | | | | 704/2 |
| 2012/0296633 | A1* | 11/2012 | Chalabi | G06F 17/2818 |
| | | | | 704/4 |
| 2013/0006954 | A1 | 1/2013 | Nikoulina et al. | |
| 2013/0226556 | A1* | 8/2013 | Hwang | G06F 17/2818 |
| | | | | 704/2 |

(Continued)

OTHER PUBLICATIONS

Koehn et al., "Statistical Phrase-Based Translation", Proceedings of HTL-NAACL 2003, May-Jun. 2003, pp. 48 to 54.*

(Continued)

*Primary Examiner* — Martin Lerner
(74) *Attorney, Agent, or Firm* — Fay Sharpe LLP

(57) ABSTRACT

A method for updating a reordering model of a statistical machine translation system includes, at a first time, receiving new training data for retraining an existing statistical machine translation system, the new training data including at least one sentence pair, each pair including a source sentence in a source language and a target sentence in a target language. Phrase pairs are extracted from the new training data and used to generate a new reordering file. A reordering model of the existing statistical machine translation system is updated, based on the new reordering file. The reordering model includes a reordering table. At a second time after the first time, new training data is received. The extracting of phrase pairs, generating of the new reordering file and the updating the reordering model is reiterated, based on the new training data received at the second time.

19 Claims, 4 Drawing Sheets

(56) References Cited

U.S. PATENT DOCUMENTS

| | | | | |
|---|---|---|---|---|
| 2014/0365201 | A1* | 12/2014 | Gao | G06F 17/2818 704/2 |
| 2015/0161109 | A1* | 6/2015 | Talbot | G06F 17/271 704/2 |
| 2015/0293910 | A1* | 10/2015 | Mathur | G06F 17/2818 704/2 |

OTHER PUBLICATIONS

Brown, Peter F., et al, "The mathematics of statistical machine translation: parameter estimation," Computational Linguistics, 19(2):263-311 (Jun. 1993).

Cappé, Olivier, et al., "On-line expectation—maximization algorithm for latent data models," J. Royal Statistical Society: Series B (Statistical Methodology), 71(3):593-613 (2009).

U.S. Appl. No. 14/276,252, filed May 13, 2014, Shachar Mirkin, et al.

Cettolo, Mauro, et al,"WIT$^3$ Web Inventory of Transcribed and Translated Talks," Proc. 16th Conf. of the European Association for Machine Translation (EAMT), pp. 261-268 (2012).

Chen, Stanley F., et al., "An empirical study of smoothing techniques for language modeling," Proc. 34th annual meeting of Association for Computational Linguistics (ACL), pp. 310-318 (1996).

Dempster, A. P., et al., "Maximum likelihood from incomplete data via the EM algorithm," J. Royal Statistical Society, Series B, vol. 39, No. 1, pp. 1-38 (1977).

Eisele, Andreas, et al., "Multiun: A multilingual corpus from United Nation documents," LREC, pp. 2868-2872 (2010).

Gao, Qin, et al., "Parallel implementations of word alignment tool," Software Engineering, Testing, and Quality Assurance for Natural Language Processing, pp. 49-57, ACL (2008).

Gao, Qin, et al., "A semi-supervised word alignment algorithm with partial manual alignments," Proc. Joint 5th Workshop on Statistical Machine Translation and Metrics MATR, WMT '10, pp. 1-10, ACL (2010).

Koehn, et al., "Moses: open source toolkit for statistical machine translation," in ACL'07: Proc. of the 45th Annual Meeting of the ACL on Interactive Poster and Demonstration Sessions, pp. 177-180 (2007).

Koehn, et al., Edinburgh system description for the 2005 IWSLT speech translation evaluation, IWSLT, pp. 68-75 (2005).

Koehn, "Europarl: a Parallel Corpus for Statistical Machine Translation," in MT Summit, vol. 5 pp. 79-86 (2005).

Levenberg, Abby, "Stream-based Statistical Machine Translation," PhD thesis, University of Edinburgh, pp. 1-99 (2011).

Levenberg, Abby, et al., "Stream-based translation models for statistical machine translation," Proc. Human Language Technologies: The 2010 Annual Conference of the North American Chapter of the Association for Computational Linguistics (HLTNAACL), pp. 394-402 (2010).

Liang, Percy et al., "Online EM for unsupervised models," Proc. Human Language Technologies: The 2009 Annual Conference of the North American Chapter of the Association for Computational Linguistics (NAACL), pp. 611-619 (2009).

Mirkin, Shachar, et al., "Assessing quick update methods of statistical translation models," Proc. 10th Int'l Workshop on Spoken Language Translation (IWSLT 2013), pp. 264-271 (Dec. 2013).

Neal, Radford, et al., "A view of the EM algorithm that justifies incremental, sparse, and other variants," Michael I. Jordan, editor, Learning in Graphical Models, pp. 355-368, MIT Press (1999).

Och, Franz Josef, "Minimum error rate training in statistical machine translation," Proc. 41st Annual Meeting of Association for Computational Linguistics (ACL)—vol. 1, pp. 160-167 (2003).

Och, Franz Josef, et al., "A systematic comparison of various statistical alignment models," Computational linguistics, 29(1):19-51 (2003).

Ortiz-Martínez, Daniel, et al., "Online learning for interactive statistical machine translation," Proc. Human Language Technologies: The 2010 Annual Conference of the North American Chapter of the Association for Computational Linguistics (HLT), pp. 546-554 (2010).

Papineni, Kishore, et al., "BLEU: a method for automatic evaluation of machine translation", ACL-2002: 40$^{th}$ Annual meeting of the Assoc. for Computational Linguistics, pp. 311-318 (2002).

Stolcke, Andreas, "SRILM—an extensible language modeling toolkit," Proc. Interspeech, pp. 257-286 (2002).

Vogel, Stephan, et al., "HMM-based word alignment in statistical translation," Proc. COLING, pp. 836-841 (1996).

* cited by examiner

SYSTEM AND METHOD FOR INCREMENTALLY UPDATING A REORDERING MODEL FOR A STATISTICAL MACHINE TRANSLATION SYSTEM

BACKGROUND

The exemplary embodiment relates to machine translation and finds particular application in connection with a system and method for incrementally training a reordering model for a statistical machine translation (SMT) system when new data becomes available.

Machine translation systems are trained on source and target language texts that are assumed to be a translation, in at least the source to target direction. Statistical machine translation systems rely on the availability of parallel corpora, in particular of the target domain. Parallel data for training SMT models is constantly being generated by both professional and casual translators. In-domain parallel data may become available, for example, as users of the SMT system post-edit the automatic translations. It is often desirable to incorporate new data into the SMT model as soon as possible. This is particularly a concern for Computer Assisted Translation (CAT) systems, where it is advantageous to reflect manual corrections promptly to avoid repeating translation errors that have already been corrected.

Typically, large amounts of parallel data are employed to produce good SMT models and training a model is an expensive process in terms of time and computational resources. Retraining the entire system at frequent intervals is thus often not feasible, leading to long lags between system updates. Approaches for incremental updating an SMT system, given new parallel data, instead of retraining it, have therefore been sought.

Typical phrase-based SMT systems use a log-linear combination of various features that primarily represent three models: a translation model (TM), responsible for the selection of a target phrase for each source phrase, a language model (LM), addressing target language fluency, and a reordering model (RM). The reordering model takes into account that different languages exercise different syntactic ordering. For example, adjectives in English precede the noun, while they typically follow the noun in French (the blue sky vs. le ciel bleu). In Modern Standard Arabic, the verb precedes the subject, and in Japanese the verb comes last. As a result, source language phrases often cannot be translated and placed in the same order in the generated translation in the target language as in the source text as phrase movements have to be considered. Estimating the exact distance of movement for each phrase tends to be too sparse. Instead, the lexicalized reordering model estimates phrase movements using only a few reordering types, such as a monotonous order (mono), where the order is preserved, and a swap, when the order of two consecutive source phrases is inverted when their translations are placed in the target side. See, for example, Philipp Koehn, "Statistical machine translation," Cambridge University Press (2009), hereinafter, Koehn 2009.

Incremental training for SMT systems has mainly focused on updating the alignment of the parallel data, the most time-consuming step in SMT training. The alignment probabilities are needed for generating the translation model and the reordering model. GIZA++ is probably the best known alignment tool, and is also the tool used in the Moses translation system. See Franz Josef Och, et al., "A systematic comparison of various statistical alignment models," Computational linguistics, 29(1):19-51 (2003). However, even with its multi-threaded version, MGIZA++ (see, Qin Gao, et al., "Parallel implementations of word alignment tool," Software Engineering, Testing, and Quality Assurance for Natural Language Processing, pp. 49-57, ACL (2008)), alignment remains the longest step in the SMT model generation. GIZA, like other alignment tools, uses the Expectation Maximization (EM) algorithm to learn simultaneously the alignment and translation probabilities (see, e.g., A. P. Dempster et al., "Maximum likelihood from incomplete data via the EM algorithm," J. Royal Statistical Society, Series B, 39(1):1-38 (1977); Peter F. Brown, et al., "The mathematics of statistical machine translation: parameter estimation," Computational Linguistics, 19(2):263-311 (June 1993), hereinafter, Brown 1993) with HMM alignments (Stephan Vogel, et al., "HMM-based word alignment in statistical translation," Proc. COLING, pp. 836-841 (1996)).

EM generally relies on having all the data available in advance. When incremental updates to the SMT system are desired, Online EM can be used to update the model parameters every time a new data point (e.g., a sentence pair) is introduced. This makes it feasible to perform more frequent updates with recent data. Several variants of online EM have been proposed. See, Percy Liang, et al., "Online EM for unsupervised models," Proc. Human Language Technologies: The 2009 Annual Conf. of the North American Chapter of the Association for Computational Linguistics (NAACL), pp. 611-619 (2009); Olivier Cappé et al., "On-line expectation-maximization algorithm for latent data models," J. Royal Statistical Society: Series B (Statistical Methodology), 71(3):593-613 (2009). For example, Stepwise EM has been used for updating the parameters of the translation and alignment models. See, Abby Levenberg, et al., "Stream-based translation models for statistical machine translation," Proc. Human Language Technologies: The 2010 Annual Conf. of the North American Chapter of the Association for Computational Linguistics (HLTNAACL), pp. 394-402 (2010). In this approach, using IBM Model 1 (Brown 1993) with HMM alignments (Stephan Vogel, et al., "HMM-based word alignment in statistical translation," Proc. COLING, pp. 836-841 (1996)), counts for translations and alignments are collected and updated by interpolating the statistics of the old and the new data. Rather than updating the alignment model for each data point, updates are performed for a set of bi-sentences, referred to as a mini-batch.

Once the alignments have been updated, it is possible to create new data-structures for the translation, reordering and language models, based on the entire data, a faster process than retraining.

Force alignment is a technique for aligning new data using an existing model. See, Qin Gao, et al., "A semi-supervised word alignment algorithm with partial manual alignments," Proc. Joint 5th Workshop on Statistical Machine Translation and Metrics MATR, WMT '10, pp. 1-10, ACL (2010). This enables adding the source and its translation as additional training material. It does not, however, make any updates to the model.

An alternative to incrementally updating alignments, referred to as Quick Updates, is to create separate models from the new data, and use them as separate models (combined with the previous models through a log-linear combination) in the complete SMT log-linear model. This approach allows even faster updates, and in some settings yields comparable results to retraining the SMT model. See, Shachar Mirkin and Nicola Cancedda, "Assessing quick update methods of statistical translation models," Proc. 10th International Workshop on Spoken Language Translation (IWSLT 2013), pp. 264-271 (December 2013). In contrast to the translation and language models, currently the most common SMT system, Moses, supports only a single reordering model. See, Philipp Koehn, et al., "Moses: Open source toolkit for statistical machine translation," Proc. ACL Demo and Poster Sessions (2007). Hence, while it is possible to create small TMs and LMs quickly, this is not possible for the reordering model, resulting with suboptimal results when no such update is performed. In particular, bi-phrases absent from the reordering model receive a default score.

There remains a need for a system and method which allow for incremental updates of the reordering model within an SMT system, such as the Moses system.

INCORPORATION BY REFERENCE

The following references, the disclosures of which are incorporated herein by reference in its entirety, are mentioned:

U.S. application Ser. No. 14/276,252, filed May 13, 2014, entitled SEMANTIC REFINING OF CROSS-LINGUAL INFORMATION RETRIEVAL RESULTS, by Shachar Mirkin, et al., discloses a method for cross language information retrieval which includes receiving an input query which includes at least one word in a source language and translating the input query from the source language to a target language to provide a set of translated queries. Documents are retrieved from a document collection based on the translated queries. The retrieved documents, in whole or in part, are translated into the source language to generate a set of translated documents. An entailment relationship between each of the translated documents and the input query is assessed. The set of translated documents is refined based on the assessment of the entailment relationship and at least a subset of the refined set of translated documents, and/or the target documents to which the translated documents in the subset correspond, is output.

U.S. Pat. No. 8,543,563, issued Sep. 24, 2013, entitled DOMAIN ADAPTATION FOR QUERY TRANSLATION, by Vassilina Nikoulina, et al., discloses a translation method which includes translating a query to generate a set of candidate translations. Features are extracted from each of the candidate translations, including a domain specific feature which is based on a comparison of at least one term in the candidate translation with words in a domain-specific corpus of documents. The candidate translations are scored and a target query is output, based on the scores of the candidate translations.

U.S. Pub. No. 20130006954, published Jan. 3, 2013, entitled TRANSLATION SYSTEM ADAPTED FOR QUERY TRANSLATION VIA A RERANKING FRAMEWORK, by Vassilina Nikoulina, et al., discloses an apparatus and method adapted to cross language information retrieval using a machine translation system trained to provide good retrieval performance on queries translated with the system.

U.S. Pub. No. 20100070521, published Mar. 18, 2010, entitled QUERY TRANSLATION THROUGH DICTIONARY ADAPTATION, by Stephane Clinchant, et al., discloses cross-lingual information retrieval by translating a query and performing information retrieval using the translated query to retrieve a set of pseudo-feedback documents. The query is retranslated using a translation model derived from the set of pseudo-feedback documents.

BRIEF DESCRIPTION

In accordance with one aspect of the exemplary embodiment, a method for updating a reordering model of a statistical machine translation system includes, at a first time, receiving new training data for retraining an existing statistical machine translation system. The new training data includes at least one sentence pair. Each of the at least one sentence pair includes a source sentence in a source language and a target sentence in a target language. Phrase pairs are extracted from the new training data. Each phrase pair includes a source language phrase and a target language phrase. A new reordering file is generated from the extracted phrase pairs. A reordering model of the existing statistical machine translation system is updated, based on the new reordering file. The reordering model includes a reordering table. At a second time after the first time, new training data for training the existing statistical machine translation system is received. The new training data includes at least one sentence pair. The sentence pair includes a source sentence in the source language and a target sentence in the target language. The extracting of phrase pairs, generating of the new reordering file and the updating the reordering model are reiterated, based on the new training data received at the second time.

One or more of the extracting phrase pairs, generating the new reordering file, and updating the reordering model may be performed with a processor.

In accordance with another aspect of the exemplary embodiment, a system for updating a reordering model of a statistical machine translation system includes a phrase pair extraction component which, at each of a plurality of times, extracts phrase pairs from new training data. The new training data includes at least one sentence pair. Each sentence pair includes a source sentence in a source language and a target sentence in a target language. Each extracted phrase pair includes a source language phrase and a target language phrase. A reordering file generation component, at each of the plurality of times, generates a new reordering file which includes only phrase pairs extracted from the new training data. An update component, at each of the plurality of times, updates a reordering model of an existing statistical machine translation system based on the new reordering file, the reordering model including a reordering table. A processor implements the phrase pair extraction component, reordering file generation component, and update component.

In accordance with another aspect of the exemplary embodiment, a method for updating a reordering model of a statistical machine translation system includes, at a first time, receiving new training data. The new training data includes sentence pairs. Each of the sentence pairs includes a source sentence in a source language and a target sentence in a target language. Phrase pairs are extracted from the new training data. Each phrase pair includes a source language phrase and a target language phrase. A new reordering file is generated from the extracted phrase pairs, the new reordering file includes only phrase pairs extracted from the new training data and their associated orientation types. A reordering model of the existing statistical machine translation system is updated, based on the new reordering file and an existing reordering table of the reordering model. The updating includes accumulating counts of the extracted phrase pairs and of phrase pairs in the existing reordering table. The receiving new training data, extracting of phrase pairs, generating of the new reordering file, and the updating the reordering model are repeated at least once at a subsequent time.

One or more of the extracting phrase pairs, generating the new reordering file, and updating the reordering model may be performed with a processor.

DETAILED DESCRIPTION

Aspects of the exemplary embodiment relate to a system and method for updating a statistical machine translation system. The system and method provide for incrementally training statistical machine translation (SMT) models when new data becomes available; that is, in contrast to re-training new models based on the entire accumulated data. Incremental training provides a way to perform faster, more frequent model updates, enabling the SMT system to be kept up-to-date with the most recent data. Specifically, the method and system provide for incrementally updating the reordering model (RM), a component in phrase-based machine translation that models phrase order changes between the source and the target languages. Updating the reordering model is helpful for improving translation quality.

In one aspect, an algorithm for updating the reordering model within the Moses SMT system is provided. The method is able to generate the same model as when training the reordering model from scratch, but is much faster, as discussed in further detail below.

The exemplary updates can be made without making significant changes to the Moses system code, allowing the Moses decoder to operate in conventional fashion. The updates help to improve performance of the SMT system as a whole.

Figure 1:
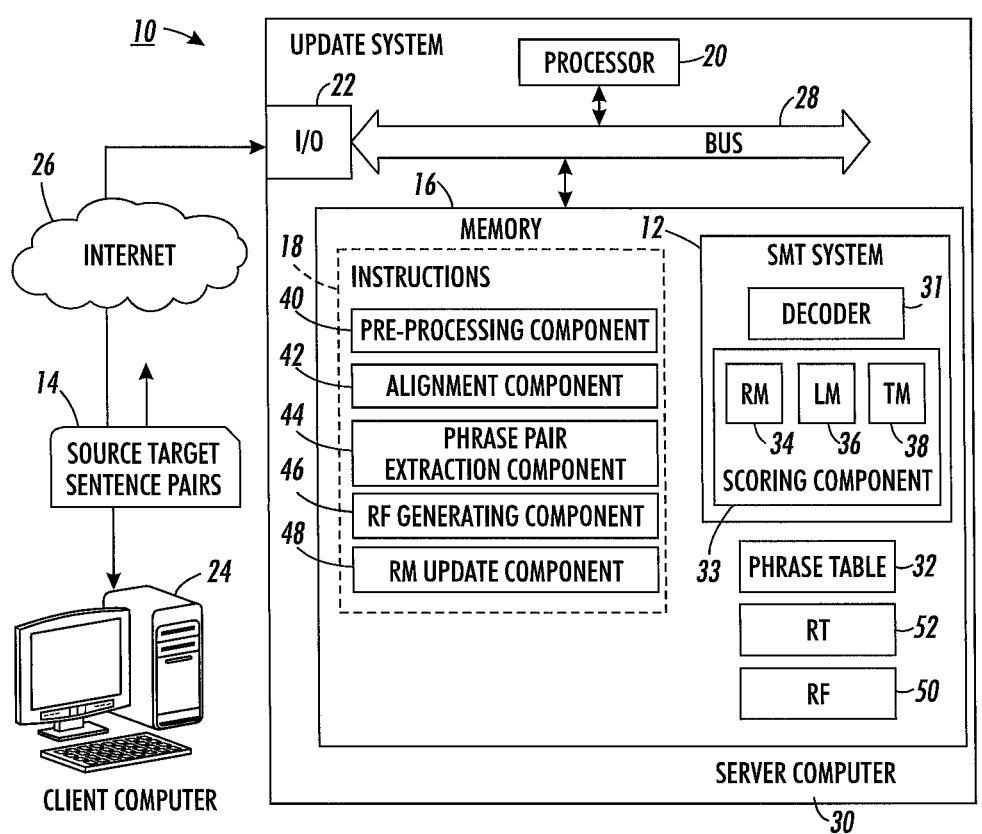
FIG. 1 is a functional block diagram of a system for updating an SMT reordering model in accordance with one aspect of the exemplary embodiment.

With reference to FIG. 1, a functional block diagram of a computer-implemented update system 10 is shown. The update system 10 is configured for incrementally updating an SMT system 12 when new training data 14 is received.

The illustrated update system 10 includes memory 16 which stores software instructions 18 for performing the SMT system updates and a processor device 20, in communication with the memory 16, for executing the instructions 18. Update system 10 also includes one or more input/output interface(s), such as a network interface 22 which receives training data 14 as input, e.g., from a client computing device 24 via a wired or wireless link 26, such as the Internet. The various hardware components 16, 18, 22 of the update system 10 may be all connected by a bus 28.

The update system 10 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 20 and memory 16 may be combined in a single chip. Memory 16 stores instructions for performing the exemplary method as well as optionally the SMT system 12 and processed data.

The illustrated network interface 22 allows the computer to communicate with other devices via a computer network, such as a local area network (LAN) or wide area network (WAN), or the Internet, and may comprise a modulator/demodulator (MODEM) a router, a cable, and and/or Ethernet port.

The digital processor device 20 can be variously embodied, such as by a single-core processor, a dual-core processor (or more generally by a multiple-core processor), a digital processor and cooperating math coprocessor, a digital controller, or the like. The digital processor 20, in addition executing instructions 18, controls the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary phrase-based SMT system 12 is configured for receiving source text in a source natural language and outputting a translation of the source text in a target natural language. Generally, the target natural language is different from the source language. The translation is performed by a decoder 31 using phrase pairs (bi-phrases) drawn from a phrase table 32, each phrase pair including a source phrase in the source language and a target phrase in the target language. The illustrated SMT system 12 includes a scoring component 33 which scores candidate translations generated by the decoder. The scoring component including a reordering model (RM) 34, a language model (LM) 36, and a translation model (TM) 38, which generate probabilities for a candidate translation that may be combined in a log-linear scoring function. The translation model 38 computes the probability that a target string (e.g., sentence) is the translation of the source string using the probabilities of each of the phrase pairs retrieved from the phrase table 32. The language model 36 computes the probability of observing the target string, based on the probabilities of seeing n-grams of the target string in a target corpus. The reordering model 34 computes the probability of observing the phrase reordering between the source and target strings. While focus is placed on the updating of the RM 34, it is to be appreciated that the LM 36 and/or TM 38 may also be updated.

The illustrated software instructions 18 include a preprocessing component 40, an alignment component 42, a phrase pair extraction component 44, a reordering file (RF) generation component 46, and a reordering model (RM) update component 48. Briefly, the new training data 14 may include source and target documents that are translations of each other. The documents may be aligned at the sentence level, i.e., each source sentence is aligned with a corresponding target sentence.

The preprocessing component 40 pre-processes the new training data 14, e.g., performs tokenization, lowercasing and optionally other preprocessing.

The alignment component 42 aligns sentence pairs, at the word (token) level, in the input documents in both directions, source-to-target and target-to-source.

The phrase pair extraction component 44 extracts phrase pairs from the aligned sentence pairs. Each phrase pair includes at least one word from the source sentence and at least one word from the target sentence, at least some of the phrase pairs including more than one word on the source and/or target side.

During an update, the reordering file generation component 46 generates a new reordering file 50, based on only the extracted phrase pairs in the new training data and associated orientation types of these extracted phrase pairs, i.e., does not consider any of the existing phrase pair data used to generate the existing SMT system. The same component 46 can generate the RF for the initial data and thus be part of the Moses system.

The RM update component 48 updates the RM 34 of the SMT system 12. In particular, the RM update component 48 generates an updated reordering table 52, the data structure of the RM 34, based on the new reordering file 50 and existing data, such as an existing reordering table or reordering file, created at a prior iteration or initially.

As will be appreciated, FIG. 1 is a high level functional block diagram of only a portion of the components which are incorporated into a computer system 10. Since the configuration and operation of programmable computers are well known, they will not be described further.

Figure 2:
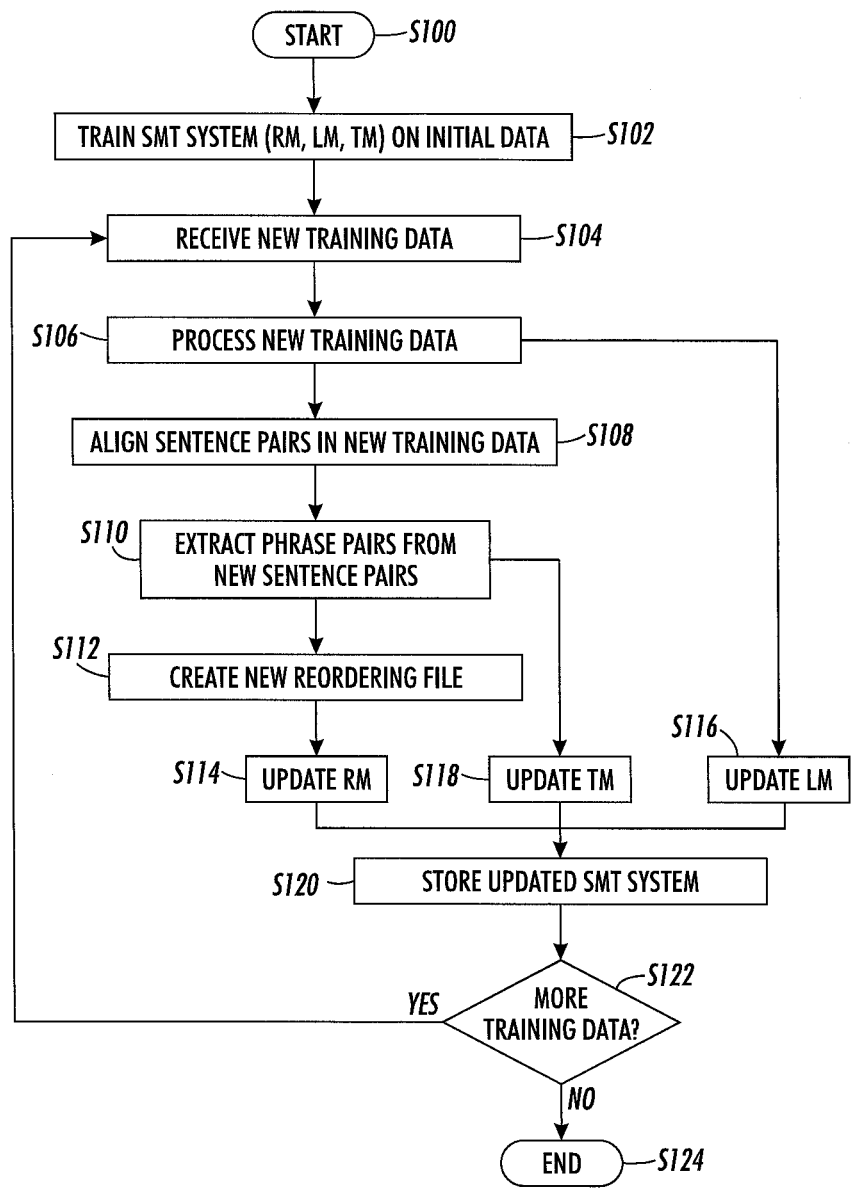
FIG. 2 is a flow chart illustrating a method for updating an SMT reordering model in accordance with another aspect of the exemplary embodiment.

FIG. 2 illustrates a method for incrementally updating the RM model 34 of an SMT system 12. The method begins at S100.

At S102, an SMT system 12 is trained on initial training data, or access to an existing SMT system 12 is provided. This may include preprocessing and word aligning the initial training data and training the RM, TM and LM on the preprocessed initial data.

At S104, at a first time some time after creation of the initial SMT system, new training data 14 is received and may be stored in system memory 16. The training data includes one or more source and target sentences that are assumed to be a translation of each other. In the exemplary embodiment, sentence pairs are received in mini-batches which include two or more (a plurality) of sentence pairs.

At S106, the new training data 14 is preprocessed by the preprocessing component 40. This may include tokenization, lowercasing and any other preprocessing of the new training data analogous to that used for the initial data. The training data 14 may be already aligned at the sentence level, for example, if it has been generated by manual correction of automated translations of sentences. If not, the preprocessing may include alignment at the sentence level.

At S108, the sentence pairs in the preprocessed new training data are word aligned by the alignment component 42, e.g., using Incremental GIZA++. This word alignment tool enables updating the alignment model multiple times with mini-batches of additional parallel data.

At S110, phrase pairs are extracted, by the extraction component 44, from the word-aligned sentence pairs generated at S108. At S112, the extracted phrase pairs are used, by the RF generating component 46, to generate a new reordering file (RF) 50. The new reordering file is created based on only the extracted phrase pairs in the new training data and associated orientation types of these extracted phrase pairs, i.e., the existing phrase pair data in an existing reordering file or reordering table is not considered in this step. Steps S110 and S112 may be combined into a single step.

At S114, the existing RM 34, created at S102 or in a prior iteration, is updated by the RM update component 48. This includes generating an updated reordering table (RT) 52 using the new RF 50 and existing data from the existing reordering file (or the existing reordering table 52) created at S102 or in a prior iteration of S110-S114.

At S116 and S118, the LM 36 and/or TM 38 may also be updated using the new training data.

At S120, the updated SMT system 12 may be stored and/or output and subsequently used for performing machine translations on source text.

At S122, if at a second time, subsequent to the first time, more training data is available, the method returns to S104. S104-S120 may thus be reiterated one, two, three or multiple times.

Otherwise, the method ends at S122.

As will be appreciated, the steps of the method need not all proceed in the order illustrated and fewer, more, or different steps may be performed.

One example for the use of the system for incremental updates is in providing transcriptions and translations for audio (or video) recordings. Since automatically performing transcription and translation tend to be error-prone, human interaction is generally used to correct the automatically-produced output. This feedback can then be used for producing improved models by performing frequent RM, TM, LM updates.

Further details of the system and method will now be described.

I. The Reordering Model (RM)

1. Reordering Probability Estimation

As noted above, the reordering model 34 estimates the probability of phrase movements between the source and the target strings (e.g., source and target sentences). To deal with sparsity, movement is measured in the lexicalized reordering model in terms of a set of orientation types, rather than an exact move distance. The default orientations (referred to as msd) used in Moses (Koehn 2009) assigned to phrase pairs extracted in order from the sentence pair are:

1. mono (monotonous): the preceding target phrase is aligned to the preceding source phrase;

2. swap: the preceding target phrase is aligned to the following source phrase; and 3. discontinued (also called other): the phrases did not occur consecutively, but other phrases were inserted between them.

For example, given the sentence pair: The dark blue sky, Le ciel bleu foncé, the source phrases are considered in the order they were selected by the decoder 31 to construct the given target sentence. Assume that the phrase pairs are simply word pairs, for illustration. Considering the direction English to French. 1. The first source phrase used for this translation is the, which is aligned to le, none has a preceding phrase, so the orientation is mono. 2. The next source phrase is sky. The preceding target phrase is le and the preceding source phrase is blue, which are not aligned to each other, thus this is not a monotonous orientation. There is no following source phrase, thus it is not a swap either, but an other orientation. 3. For the source phrase blue, the following source phrase is sky, and it is aligned to the preceding target, ciel, meaning it is a swap. 4. As for the source phrase dark, the following source phrase is blue; it is aligned to the preceding target phrase bleu, so it is a swap again.

Formally, the probability of each of the above orientation types o, for a source phrase f and a target phrase e is denoted p(o|f,e). Counting the orientation instances of each phrase pair from the word alignments, in each direction, maximum likelihood is used to estimate this probability:

$$\hat{p}(o \mid f, e) = \frac{\text{count}(o, f, e)}{\sum_{o'} \text{count}(o', f, e)} = \frac{\text{count}(o, f, e)}{\text{count}(f, e)} \quad (1)$$

o' indicates all orientation types. The probability estimation can be smoothed by additive (Laplace) smoothing with a factor σ:

$$\hat{p}(o \mid f, e) = \frac{\sigma + \text{count}(o, f, e)}{\sum_{o'} \sigma + \text{count}(f, e)} \quad (2)$$

For example, 0<σ. In one embodiment, σ<1, e.g., σ=0.5.

2. Data Structures

Reordering File:

During the training of the phrase-based Moses SMT system 12, phrase pairs are extracted from the word-aligned parallel data 14 and used for training both the TM 38 and the RM 34. Within the phrase extraction step (S110-S112), three files containing the list of phrase pairs are created. Two of them include the word alignments within the phrases, one in each direction (source-to-target and target-to-source). The third is a reordering file (RF) 50, which shows the orientation of each occurrence of the phrase pair, in each direction. Phrase pairs are alphabetically ordered in these files, and are repeated if more than one instance of the phrase pair is encountered.

Table 1 shows a few lines from an example reordering file of an English to French model, built with the msd (monotonous-swap-discontinued) orientations (Philipp Koehn, et al., "Edinburgh system description for the 2005 IWSLT speech translation evaluation, IWSLT, pp. 68-75 (2005)) (this is the msd-bidirectional-fe model, also referred to as wbe-msd-bidirectional-fe-allff). Each line in the reordering file 50 includes three parts, separated by '|||': source phrase, target phrase, and two indicators of the orientation in which this instance was found, when extracting the phrases from source-to-target and from target-to-source alignments.

TABLE 1

Sample lines from a Moses Reordering File with phrase pairs and their associated forward and reverse msd orientation types but of course ||| mais bien sûr ||| mono mono
but of course ||| mais bien sûr ||| mono other
but of course ||| mais bien sûr ||| mono other
...
confusion between the ||| confusion entre le ||| other other
confusion between the ||| confusion parmi les ||| other mono
...
emerging ||| naissante ||| mono mono
emerging ||| naissante ||| other mono
emerging ||| naissante ||| other mono
emerging ||| naissante ||| other other
emerging ||| naissante ||| swap other
emerging ||| naissante ||| swap other
emerging ||| naissante ||| swap other Reordering Table:

The reordering table (RT) 52 is created from the reordering file (RF) 50 and is the data structure of the reordering model 34. While the RT 52 is described as a table, it can be any suitable data structure. It contains the probability estimations for each orientation of a phrase pair in each direction. In contrast to the reordering file 50, in the RT, each phrase pair appears only once. Table 2 shows a few lines from a conventional reordering table. The scores are the probability estimations, normalized so they sum to 1 for each direction. For ease of illustration, the scores are rounded to 2 decimal places.

TABLE 2

Sample lines from a conventional Moses reordering table generated for the msd orientations, with 6 feature scores for each phrase pair but of course ||| mais bien sûr ||| 0.78 0.11 0.11 0.33 0.11 0.56
...
confusion between the ||| confusion entre le ||| 0.20 0.20 0.60 0.20 0.20 0.60
confusion between the ||| confusion parmi les ||| 0.20 0.20 0.60 0.60 0.20 0.20
...
emerging ||| naissante ||| 0.18 0.41 0.41 0.41 0.06 0.53

The first three scores are computed based on the orientation counts for the forward direction (source-to-target) and the last three are for the reverse direction (target-to-source). As will be appreciated, if there are fewer or more orientations being considered, there may be fewer or more than six feature scores (normalized probability estimates).

II. Updating the Reordering Model

1. Reordering Model Generation

Several steps are performed before a Moses RM is trained. These include:

1. Corpus preparation: tokenization, lowercasing and any other preprocessing (as for S106).
2. Corpus alignment in both directions, source-to-target and target-to-source (as for S108).
3. Bidirectional phrase extraction (as for S110).
4. Creation of the reordering file (as for S112).

Some of these steps are also employed for other purposes. For example, corpus preparation is also used for LM training (as in S114), and corpus alignment and bidirectional phrase extraction are also used for training the TM. In practice, the creation of the reordering file (S112) may be performed within the bidirectional phrase pair extraction step (S110).

From an initial reordering file, the initial reordering table 52 may be created by counting the number of occurrences of each orientation in each direction and normalizing by the total number of occurrences of the phrase pair, as shown in Equation 2.

2. Update of the Reordering Model (S114)

Several methods are noted below for generating an updated reordering model 34, given new data 14. In a multi-update scenario, the reordering model 34 is updated with new data repeatedly, rather than only once.

In the following update methods, the tasks that are performed are listed and their complexity analyzed, where the size of a data structure is measured in terms of the number of lines it contains. It can be assumed that the data that was already used to train the current reordering model (the existing data) is significantly larger than the training data which is being used for a single update (the new data). This is typically the case, for example, with training data that is based on human feedback, as described earlier. For simplicity, the existing data is referred to as $\mathcal{A}$ and the new data as $\mathcal{B}$, without iteration indices. As the method proceeds with subsequent update iterations, $\mathcal{A}$ keeps growing (the new $\mathcal{A}$ is the result of the $\mathcal{A}$ and $\mathcal{A}$ of the prior iteration), while the size of the new $\mathcal{B}$ does not depend on prior iterations.

The set of phrase pair instances generated from the training data (the phrase pairs in the reordering file 50) are denoted as $\mathcal{P}$, with subscript $\mathcal{A}$, $\mathcal{B}$ or $\mathcal{AB}$, denoting whether it refers to the existing, new or merged (updated) data, respectively. $\mathcal{B}$ is typically much smaller than $\mathcal{A}$: $|\mathcal{P}_\mathcal{B}| \ll |\mathcal{P}_\mathcal{A}|$, and the merged set is at least as large as the existing one. That is, $|\mathcal{P}_{\mathcal{AB}}| \geq |\mathcal{P}_\mathcal{A}|$, and $\mathcal{P}_{\mathcal{AB}}$ is strictly larger than $\mathcal{P}_\mathcal{A}$ if any new phrase pairs are found in the new data relative to the existing one.

In contrast to the reordering file, the reordering table 52 contains only unique phrase pairs. The set of unique phrase pairs in each data structure is denoted with the superscript (u). For example, the phrase pairs in an RT for new data are marked as $\mathcal{P}_\mathcal{B}^{(u)}$, where $|\mathcal{P}_\mathcal{B}^{(u)}| \leq |\mathcal{P}_\mathcal{B}|$. As an example of the involved sizes, a reordering file created from 500,000 lines of the tokenized, lowercased Europarl corpus (Philipp Koehn, "Europarl: A parallel corpus for statistical machine translation," Proc. MT Summit, pp. 79-86 (2005)) contains approximately 57 million lines of non-unique phrase pairs, and the reordering table contains 33 million pairs (58%); the figures for the complete Europarl corpus (1.96 million lines after cleaning) are 219 million for the reordering file in comparison to 107 million lines for the RT (49%). As will be appreciated, the more data that is used, especially of the same domain, the fewer new phrase pairs can be expected to be seen since the RT contains only unique phrase pairs. The ratio of RT:RF sizes is thus expected to decrease with more data.

A. Constructing a Reordering Table from Scratch

This is the non-incremental option for constructing the reordering table. Phrase pairs are extracted from the entire data $\mathcal{A}$ and $\mathcal{B}$, sorted and a reordering table is constructed. This is the slowest option, and the only one available to date in Moses.

Figure 3:
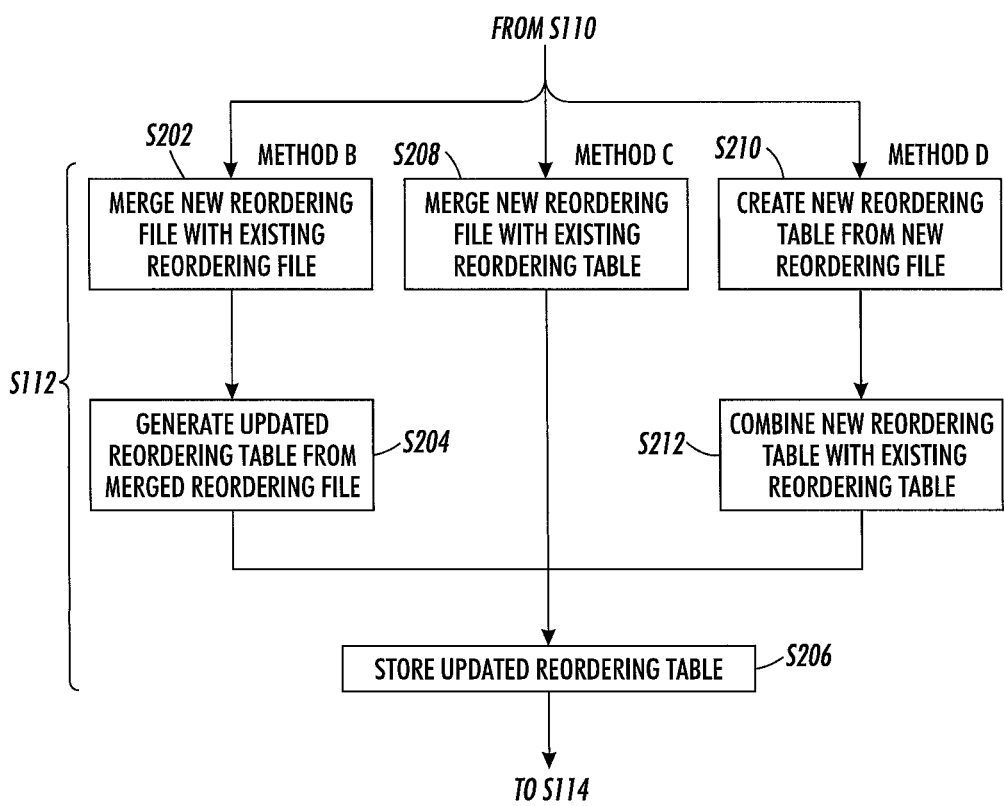
FIG. 3 illustrates methods for updating the reordering model in the method of FIG. 2.

All of the following update methods are incremental and are illustrated in FIG. 3. Using Incremental GIZA, the incremental update methods produce the same RT 52. With respect to complexity, it is assumed that the existing RF and the existing RT (based on existing data $\mathcal{A}$) are available at no cost because they were created in a previous training iteration. It is also assumed that phrase extraction of the new data (data $\mathcal{B}$), from which the new RF is created, is performed without additional cost, since it is also used for updating the translation model 38.

B. Merging Reordering Files and Creating a Merged Reordering Table

In this method, at S202, the new reordering file $P_\mathcal{A}$ created at S112 is merged with the existing reordering file $P_\mathcal{B}$ (created for the initial SMT or in a prior iteration) and at S204, an updated reordering table is created from the merged reordering file and stored (S206).

Given a new reordering file created solely from the new data $\mathcal{B}$, the merge of two reordering files (S202) can be performed in one of two ways:

1. concatenate RFs $P_\mathcal{A}$ and $P_\mathcal{B}$ and sort the concatenation; and 2. since both the existing RF $P_\mathcal{A}$ and the RF $P_\mathcal{B}$ for the new data are sorted, read the files line-by-line in parallel and merge them to a single file $P_{\mathcal{AB}}$ that is already sorted. This can be performed in linear time in the size of the two reordering files, $\Theta(|P_\mathcal{A}|+|P_\mathcal{B}|)$.

A single, updated reordering table 52 is then created at S204 by an additional pass over the merged reordering file $P_{\mathcal{AB}}$. The merge of reordering files and creation of the updated reordering table 52 can be collapsed into one step, requiring a single pass, but this cannot avoid creating the merged reordering file $P_{\mathcal{AB}}$, since in this method, the merged RF is used for the next update cycle.

C. Merging a Reordering File with an Existing Reordering Table

As shown in FIG. 3, at S208, the new reordering file $P_\mathcal{B}$ is merged with the existing reordering table RT $\mathcal{P}_\mathcal{A}^{(u)}$ and the resulting updated table is stored at S206.

In this method, occurrence counts (the number of occurrences of each phrase pair) are tracked, since this information is lost during the creation of a conventional reordering table. The occurrence counts may be stored in the reordering table itself. A pass of the existing RT $\mathcal{P}_\mathcal{A}^{(u)}$ and the new RF $P_\mathcal{B}$ is performed at the same time, comparing their entries. This can be performed in linear time in the size of the existing reordering table and new reordering file $(\Theta(|\mathcal{P}_\mathcal{A}^{(u)}|+|P_\mathcal{B}|))$. Entries occurring only in RT $\mathcal{P}_\mathcal{A}^{(u)}$ are copied as-is to the updated RT $\mathcal{P}_{\mathcal{AB}}^{(u)}$, and new entries are created in RT $\mathcal{P}_{\mathcal{AB}}^{(u)}$ for phrase pairs that appear only in RF $P_\mathcal{B}$, using all the lines of the same phrase pair to compute the probability estimations and the occurrence count. Whenever a phrase pair that exists in both is encountered, the probability estimations of the pair are updated in the RT $\mathcal{P}_{\mathcal{AB}}^{(u)}$, based on the accumulated counts from the two data structures. The probability scores in the RT $\mathcal{P}_\mathcal{A}^{(u)}$ can be converted to counts and back again using Eqn. 2, as illustrated below in Eqns. 3-5.

D. Merging Two Reordering Tables

As shown in FIG. 3, at S210, the new reordering file is used to generate a new reordering table. At S212, the new reordering table is merged with the existing reordering table and the resulting updated table is stored at S206.

In this method, occurrence counts are tracked, as for method C. Here, however, a new RT $\mathcal{P}_\mathcal{B}^{(u)}$ is first created solely from the new data reordering file $P_\mathcal{B}$ (computation time is linear in $\Theta(|P_\mathcal{B}|)$), and then the existing RT $\mathcal{P}_\mathcal{A}^{(u)}$ and the new RT $\mathcal{P}_\mathcal{B}^{(u)}$ are merged to generate the updated RT $\mathcal{P}_{\mathcal{AB}}^{(u)}$. The merge time is linear in the size of the two tables, $\Theta(|\mathcal{P}_\mathcal{A}^{(u)}|+|\mathcal{P}_\mathcal{B}^{(u)}|)$. Starting with the two sorted tables, the resulting merged table is also sorted. As for method C, entries of unique phrase pairs are copied as-is to the merged RT $\mathcal{P}_{\mathcal{AB}}^{(u)}$, and when two lines with the same phrase pair are encountered, the pair's probability estimations are updated based on the sum of its counts in the two tables. If occurrence counts are stored in the reordering tables RT $\mathcal{P}_\mathcal{B}^{(u)}$, $\mathcal{P}_\mathcal{A}^{(u)}$, $\mathcal{P}_{\mathcal{AB}}^{(u)}$, themselves, once the merged table has been created, there is no further need to keep the reordering files. The merged RT $\mathcal{P}_{\mathcal{AB}}^{(u)}$ is sufficient for subsequent update cycles.

This method may be slightly slower than the method C since it requires creation of the new RT $\mathcal{P}_\mathcal{B}^{(u)}$. However, any processing of $\mathcal{B}$ is fast in terms of actual runtime, due to its small size in the typical case. In the following, a fuller description of method D is provided, by way of example.

III. Example Method for Merging Reordering Tables

An algorithm for a reordering model update via the merge of two reordering tables is shown in Algorithm 1 below. As mentioned in Section II-D, this update method involves keeping track of the number of occurrences of each phrase pair. The format and details of this extension of the reordering table is first described followed by details of the suggested merge itself.

1. Reordering Table with Counts

To enable updating the reordering table without generating it from scratch, the method described in II-D above keeps a track of the number of occurrences of each phrase pair. To do so without making changes to Moses code significantly, the total count of a phrase pair (the total number of times it occurred in the phrase pairs used to generate that table) is added as an additional feature value, e.g., following the feature scores for the orientation types in the reordering table. Table 3 shows several lines of the reordering table shown in Table 2, now including counts. For example the first phrase pair has been observed three times. When two phrase tables are merged, the counts are combined.

TABLE 3

Sample lines from a reordering table with counts but of course ||| mais bien sûr ||| 0.78 0.11 0.11 0.33 0.11 0.56 3
...
confusion between the ||| confusion entre le ||| 0.20 0.20 0.60 0.20 0.20 0.60 1
confusion between the ||| confusion parmi les ||| 0.20 0.20 0.60 0.60 0.20 0.20 1
...
emerging ||| naissante ||| 0.18 0.41 0.41 0.41 0.06 0.53 7

As will be appreciated, the reordering table created in method II-C can be similarly configured.

An example of calculating the orientation scores in Table 3 in the source-to-target direction, using Equation 2 is shown below. In the following equations, S(•) is a scoring function and C(•) is a count function, using counts from the reordering file; f is 'emerging' and e is 'naissante' from Table 3, which occur a total of 7 times, out of which, the mono orientation occurs once in this direction, and each of swap and other occurs 3 times. Each score is the result of smoothing the counts with a smoothing factor σ of 0.5 to avoid probabilities of zero. While demonstrated on the msd model, the method is also applicable to different sets of orientations.

$$S(mono|f, e) = \frac{\sigma + C(mono, f, e)}{3\sigma + C(f, e)} = \frac{0.5 + 1}{1.5 + 7} = 0.18 \quad (3)$$

$$S(swap|f, e) = \frac{\sigma + C(swap, f, e)}{3\sigma + C(f, e)} = \frac{0.5 + 3}{1.5 + 7} = 0.41 \quad (4)$$

Hence, recovering from the score the count of a specific orientation (e.g. mono) for a given phrase pair can be achieved as follows:

$$C(mono, f, e) = S(mono|f, e) \times (3\sigma + C(f, e)) - \sigma \quad (5)$$
$$= 0.18 \times (1.5 + 7) - 0.5 = 1$$

This is used, for example, in method D to generate the scores in the merged table when a phrases pair occurs in both $\mathcal{P}_\mathcal{A}^{(u)}$ and $\mathcal{P}_\mathcal{B}^{(u)}$: the scores for each orientation are first converted to counts using Eqn. 5, the two counts for a phrase pair orientation are added and the sum of the two counts is converted back to a respective score using Eqn. 2. This is then inserted into the merged table $\mathcal{P}_{\mathcal{AB}}^{(u)}$. Similarly it can be used in Method C to add the count for a phrase pair orientation from the RT $\mathcal{P}_\mathcal{A}^{(u)}$ to that computed from the RF.

To support an RT with counts, the configuration (ini) file is adjusted to include an additional feature, giving seven features instead of six (the number of features in the msd model), and its weight is set to 0. Table 4 shows the relevant lines from a tuned configuration file, updated to support counts.

TABLE 4

Example Moses ini file with changes to support RT counts

LexicalReordering name=LexicalReordering0 num-features=7 type=wbe-msd-bidirectional-fe-allff input-factor=0 output-factor=0
LexicalReordering0= 0.0857977 0.0655027 0.0486593 0.115916 −0.0182552 0.0526204 0

2. Merging RTs

Algorithm 1 illustrates pseudo code for merging two reordering tables 52 with counts, referred to herein as $R_\mathcal{A}$ and $R_\mathcal{B}$, into a single one, $R_{\mathcal{AB}}$. The procedure is as follows: the reordering tables are read in parallel, one line at a time (line i of $R_\mathcal{A}$, line j of $R_\mathcal{B}$), starting with the first lines, denoted $R_\mathcal{A}^{(1)}$, $R_\mathcal{B}^{(1)}$, and the phrase pair in the existing table $R_\mathcal{A}$ is compared with the one in the new table $R_\mathcal{B}$. The comparison is alphabetical, using a string made of the source phrase, the delimiter and the target phrase. As long as neither table has been fully read (step 4), steps 5-15 are used. When the two lines refer to different phrase pairs (step 5 or 8), the one that alphabetically precedes the other is added to the merged table $R_{\mathcal{AB}}$, and the next line read from that table $R_\mathcal{A}$ or $R_\mathcal{B}$ (by incrementing i or j, respectively, at step 7 or 10). If the lines refer to the same phrase pair (step 11), the lines are merged into a single one (step 12), which is written into $R_{\mathcal{AB}}$, and the algorithm advances to the next line in both tables $R_\mathcal{A}$ and $R_\mathcal{B}$ (by incrementing i and j at step 13), When one of tables $R_\mathcal{A}$ and $R_\mathcal{B}$ has been read completely (line 15), the remainder of the other one is written into $R_{\mathcal{AB}}$ (lines 16-22).

Merging of two lines into a single one (MERGE_LINES in step 12 of Algorithm 1) may be performed as follows:

1. Convert the feature scores in each line into counts, as in Equation 5.
2. Sum up the counts for each orientation, as well as the total count.
3. Convert the updated counts of the orientations back to scores, as in Equations 3 and 4.

As noted above, the complexity of this algorithm is linear in the length of the tables, i.e. $\Theta(|\mathcal{P}_A^{(u)}|+|\mathcal{P}_B^{(u)}|)$. In terms of memory usage, neither table is fully loaded into memory. Instead, at any given time, a single line from each table is read.

| Algorithm 1: Merging reordering tables with counts |
|---|
| 1:     procedure Merge_R_TABLES($R_A$, $R_B$) |
| 2:        Read first lines of $R_A$ and $R_B$, $R_A^{(1)}$, $R_B^{(1)}$ |
| 3:        i: = 1; j: = 1 |
| 4:        while $R_A^{(i)} \neq$ null and $R_B^{(j)} \neq$ null do |
| 5:           if $R_A^{(i)} < R_B^{(j)}$ then // Compare bi-phrases |
| 6:              $R_A^{(i)} \rightarrow R_{AB}$ |
| 7:              i: = i + 1 |
| 8:           else if $R_A^{(i)} > R_B^{(j)}$ then |
| 9:              $R_B^{(j)} \rightarrow R_{AB}$ |
| 10:            j: = j + 1 |
| 11:          else // Identical bi-phrases |
| 12:             MERGE_LINES($R_A^{(i)}$, $R_B^{(j)}$) $\rightarrow R_{AB}$ |
| 13:             i: = i + 1; j: = j + 1 |
| 14:        end if |
| 15:        end while |
|         // Write the rest of the tables: |
|         // at least one of them is EOF |
| 16:        while $R_A^{(i)} \neq$ null do |
| 17:           $R_A^{(i)} \rightarrow R_{AB}$ |
| 18:           i: = i + 1 |
| 19:        end while |
| 20:        while $R_B^{(j)} \neq$ null do |
| 21:           $R_B^{(j)} \rightarrow R_{AB}$ |
| 22:           j: = j + 1 |
| 23:        end while |
| 24:     end procedure |

In some embodiments, the incremental updates of the reordering model may be weighted. This may enable giving, for example, more weight to in-domain vs. out-of-domain data or to more recently acquired data.

In another embodiment, the method updates the binarized version of the reordering table, which enables using the reordering model without loading it into memory.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the method. As will be appreciated, while the steps of the method may all be computer implemented, in some embodiments one or more of the steps may be at least partially performed manually.

Without intending to limit the scope of the exemplary embodiment, the following examples illustrate the application of the method.

EXAMPLES

The updating the reordering model is evaluated from two aspects: (i) translation performance and (ii) run-time. First, it is shown that incrementally updating the RT for the reordering model helps improving translation, as reflected in the BLEU score (Kishore Papineni, et al.," Proc. 40th Annual Meeting of Association for Computational Linguistics (ACL), pp. 311-318 (2002)); then it is shown that the incremental update is faster than the complete one.

As data, the IWSLT 2013 Evaluation Campaign data of the English-French MT track was used (release=2013-01). The initial model was trained with 10,000 WIT3 sentence-pairs with 50,000 additional ones being used to train updated models (see, Mauro Cettolo, et al., "WIT3: Web inventory of transcribed and translated talks," Proc. 16th Conf. of the European Association for Machine Translation (EAMT), pp. 261-268 (2012) for a discussion of this data). The additional data is split into ten parts of 5,000 bi-sentences each, each part being added to the data used in the prior iteration to generate an updated model. Moses is used as the phrase-based SMT system (the version released on Mar. 14, 2014), with a configuration comprising a single phrase table and a single LM. 5-gram language models are trained on the target-side of the training data, using SRILM (Andreas Stolcke, "SRILM—an extensible language modeling toolkit," Proc. Interspeech, pp. 257-286 (2002)) with modified Kneser-Ney discounting (Stanley F. Chen, et al., "An empirical study of smoothing techniques for language modeling," Proc. 34th Annual Meeting of Association for Computational Linguistics (ACL), pp. 310-318 (1996)). Mean Error Rate Training (MERT) (Franz Josef Och, "Minimum error rate training in statistical machine translation," Proc. 41st Annual Meeting of Association for Computational Linguistics (ACL)—Volume 1, pp. 160-167 (2003)) is used for tuning the initial model using the development set of the abovementioned campaign, consisting of 887 sentence-pairs, and optimizing towards BLEU. The models are evaluated with BLEU over the campaign's test set of 1664 bi-sentence. All datasets were tokenized, lowercased and cleaned using the standard Moses tools.

In each of the experiments, Incremental GIZA was used. This allows updating the alignment and translation models without aligning all the training data at every iteration. With Incremental GIZA, the alignment of the parallel data is identical in both the incremental and the complete RM generation experiments, since even though the alignment probabilities are being updated, only the new data is being aligned, while the existing data is left untouched. As a result, the same phrase pairs are obtained from the new data for both RM generation methods. Given that, the algorithm produces exactly the same reordering model as its generation from the entire data (up to numerical accuracy).

Translation performance (BLEU) is measured when incrementally updating the model with additional data, over 10 update cycles, with different combinations of Reordering, Translation and Language models.

1. Translation Performance

Figure 4:
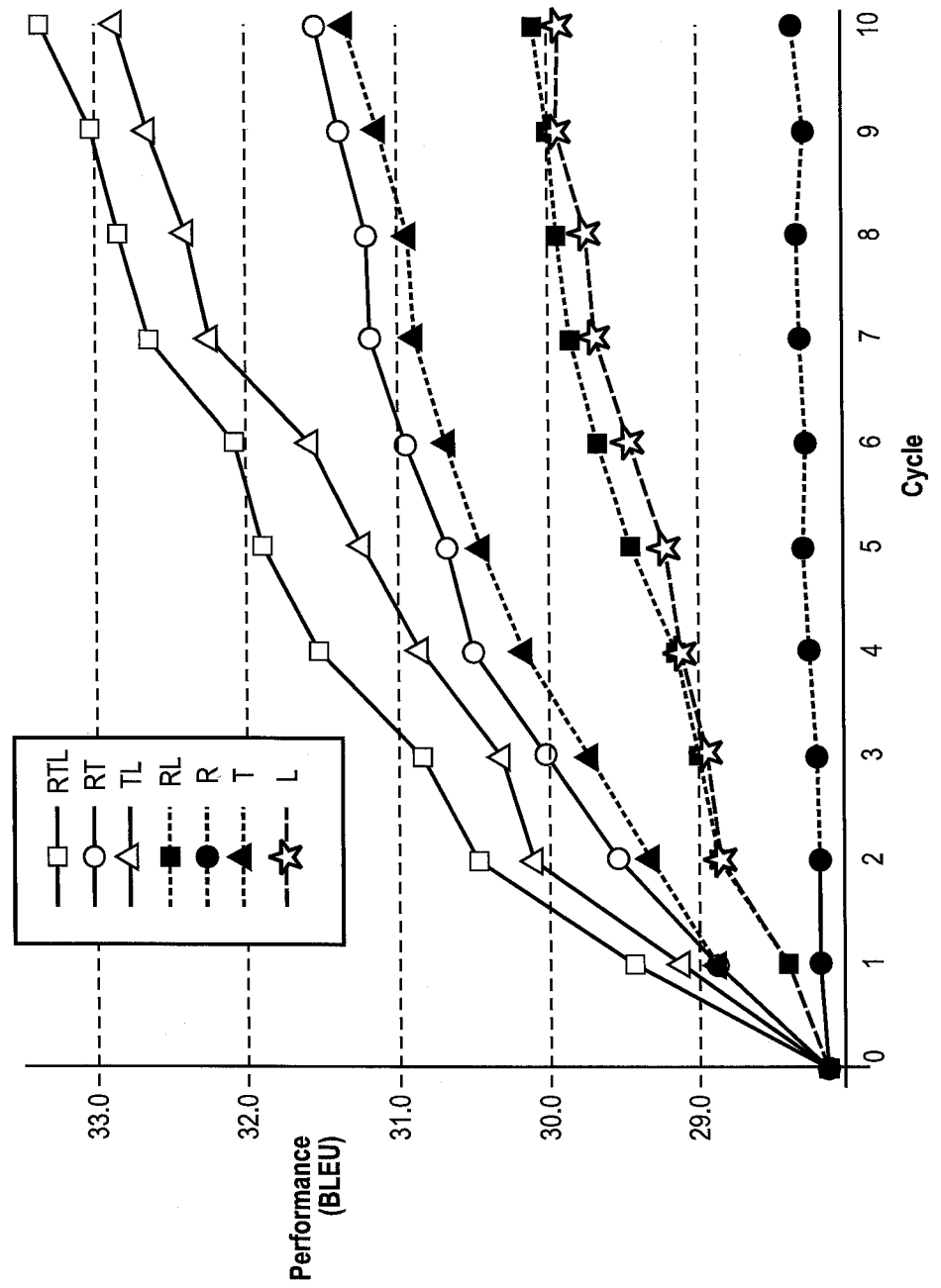
FIG. 4 is a plot of BLEU scores for an SMT system trained with additional data, over 10 cycles, by updating different combinations of Reordering, Translation and Language models.

Updating the reordering table helps to achieve better translation quality. To demonstrate this, all possible combinations of updating the three phrase-based SMT sub-models (reordering, translation and language models, denoted R, T and L, respectively) were evaluated. FIG. 4 shows the results of the experiments with each of these combinations. The results suggest that updating the reordering model without updating the translation model has very little impact on results, since new phrase pairs from the new data that are not added to the phrase table cannot be used in the translation. This is reflected in the almost flat line of experiment R, and in the very similar results of RL in comparison to L. The slight improvement in this case may be attributed to more statistics that have been accumulated for the phrase pairs that already existed in the initial data. However, when the translation model is updated, adding the updated reordering model improves the performance significantly, as seen in RTL vs. TL and RT vs. T.

2. Run-Time

The time to train a reordering model from scratch (complete training) is compared with the incremental update method. For this experiment, the English-French Europarl corpus, with 1.96 million parallel sentences was used as $\mathcal{A}$ and 10,000 WIT3 sentence-pairs were used as $\mathcal{B}$. Other settings were as described above.

To measure the run-time of the required steps objectively, regardless of the computer's load at the specific time of experiment, the Linux command time was used, summing up the user and sys times, i.e., the total CPU-time that the process spent in user or in kernel modes. All measurements were conducted on a 64-bit Centos 6.5 Linux server, with 128 GB of RAM and 2 Intel Xeon 6-core 2.50 GHz CPUs.

A complete reordering model update, when using Incremental GIZA, consists of the following steps:

1. Extracting phrase pairs and creating a reordering file from all the data ($\mathcal{A} \cup \mathcal{B}$).

2. Creating a reordering table from the single reordering file of $\mathcal{A} \cup \mathcal{B}$.

In comparison, the incremental update entails the following steps:

1. Extracting phrase pairs and creating a reordering file from only the new data ($\mathcal{B}$).

2. Creating a reordering table from the reordering file of $\mathcal{B}$.

3. Merging the RTs of $\mathcal{A}$ and $\mathcal{B}$.

The time required for generating the incremental reordering model is 17.6 minutes as compared to 83.6 minutes for the complete reordering model, i.e., 4.75 times faster.

In these examples, $\mathcal{A}$ represents a corpus of medium size, and in practice, the initial corpus may be much larger. For example, the MultiUN corpus (Andreas Eisele, et al., "Multiun: A multilingual corpus from United Nation documents," LREC (2010)) consists of 13.2 million parallel sentences for this language pair accessed on Aug. 7, 2014). For $\mathcal{B}$, where daily system updates are to be performed, then a set of 10,000 sentences pairs constitutes a substantial amount of data in terms of what can be expected to be obtained in a single day. Hence, the time gain in practice may be even larger.

The examples show that updating this model is useful for obtaining improved translation, even for a language pair such as English-French, where phrase movements are not very prominent (in comparison to English-Japanese, for example). The method allows incrementally training the reordering model within the Moses SMT system, which can be done much faster than a complete retrain. It thus enables more frequent SMT model updates allowing the SMT system to benefit from newly obtained data and user feedback and reflecting it in the system's translation.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for updating a reordering model of a statistical machine translation system comprising:

at a first time, receiving new training data for retraining an existing statistical machine translation system, the new training data comprising at least one sentence pair, each of the at least one sentence pair comprising a source sentence in a source language and a target sentence in a target language;

extracting phrase pairs from the new training data, each phrase pair including a source language phrase and a target language phrase;

generating a new reordering file from the extracted phrase pairs, the new reordering file including a set of the phrase pairs extracted from the new training data;

updating a reordering model of the existing statistical machine translation system based on the new reordering file, the reordering model including a reordering table, the reordering table comprising phrase pairs and a set of features, the set of features comprising, for each of a set of orientation types, at least one feature which is a function of a count of the orientation type for the respective phrase pair, each phrase pair in the reordering table occurring only once, and wherein the updating of the reordering model includes merging an existing reordering table with the new reordering file or merging the existing reordering table with a new reordering table generated from the new reordering file, the merging including updating feature scores for each of the orientation types for at least some of the phrase pairs based on the counts stored in the existing reordering table;

at a second time after the first time, receiving new training data for training the existing statistical machine translation system, the new training data comprising at least one sentence pair, the sentence pair comprising a source sentence in the source language and a target sentence in the target language; and reiterating the extracting of phrase pairs, generating of the new reordering file and the updating the reordering model based on the new training data received at the second time, wherein at least one of the extracting phrase pairs, generating the new reordering file, and updating the reordering model is performed with a computer processor.

2. The method of claim 1, wherein the updating of the reordering model comprises merging the new reordering file with an existing reordering file created in a prior iteration to generate a new reordering table for the reordering model.

3. The method of claim 1, wherein the updating of the reordering model comprises merging the new reordering file with an existing reordering table created in a prior iteration to generate a new reordering table for the reordering model.

4. The method of claim 1, wherein the updating of the reordering model comprises creating a new reordering table from the new reordering file and merging the new reordering table with an existing reordering table created in a prior iteration to generate a new reordering table for the reordering model.

5. The method of claim 1, wherein the creating of the new reordering file comprises assigning orientation types to the extracted phrase pairs from a predefined set of at least two orientation types.

6. The method of claim 5, wherein the set of at least two orientation types comprises three orientation types.

7. The method of claim 5, when the orientation types include:
monotonous, for phrase pairs for which the preceding target phrase is aligned to the preceding source phrase;
swap, for phrase pairs for which the preceding target phrase is aligned to the following source phrase; and
other, for phrase pairs for which the preceding target phrase is aligned to a non-consecutive source phrase.

8. The method of claim 5, wherein the update of the reordering model comprises updating occurrences of each of the orientation types of each of the phrase pairs stored in the reordering table.

9. The method of claim 1, wherein in the reordering table, the set of features comprises, for each of a set of orientation types, at least one feature which is a function of a count of the orientation type for the respective phrase pair.

10. The method of claim 1, wherein, the merging compares lines of the reordering tables sequentially and where two lines match the method includes converting the feature scores in each line into counts, summing counts for each orientation, as well as the total count, and converting the updated counts of the orientations back to scores.

11. The method of claim 1, further comprising, prior to the extracting of phrase pairs, aligning the at least one sentence pair at a word level.

12. The method of claim 1 further comprising updating at least one of a language model and a translation model of the statistical machine translation system.

13. The method of claim 1, wherein the reiterating is performed at a plurality of times subsequent to the second time.

14. The method of claim 1, wherein the new training data comprises a plurality of the sentence pairs.

15. The method of claim 1, wherein the new reordering file includes only phrase pairs extracted from the new training data.

16. A computer program product comprising non-transitory memory storing instructions which, when executed by a processor, perform the method of claim 1.

17. A system comprising memory which stores instructions for performing the method of claim 1 and a processor in communication with the memory for executing the instructions.

18. A system for updating a reordering model of a statistical machine translation system comprising:
a phrase pair extraction component which, at each of a plurality of times, extracts phrase pairs from new training data, the new training data comprising at least one sentence pair, each of the at least one sentence pair comprising a source sentence in a source language and a target sentence in a target language, each phrase pair including a source language phrase and a target language phrase;
a reordering file generation component which, at each of the plurality of times, generates a new reordering file, the new reordering file including only phrase pairs extracted from the new training data and their associated orientation types;
an update component which, at each of the plurality of times, updates a reordering model of an existing statistical machine translation system based on the new reordering file, the reordering model including a reordering table, the reordering table comprising phrase pairs and a set of features, the set of features comprising, for each of a set of orientation types, at least one feature which is a function of a count of the orientation type for the respective phrase pair, each phrase pair in the reordering table occurring only once, and wherein the updating of the reordering model includes one of:
merging the new reordering file with an existing reordering file created in a prior iteration to generate a merged reordering file and creating the updated reordering table from the merged reordering file,
merging the new reordering file with an existing reordering table created in a prior iteration, the existing reordering table tracking occurrence counts of phrase pairs in the reordering table, to generate a new reordering table for the reordering model, and
merging an existing reordering table with a new reordering table generated from the new reordering file, the merging including updating feature scores for each of the orientation types for at least some of the phrase pairs based on counts stored in the existing reordering table; and
a processor which implements the phrase pair extraction component, reordering file generation component, and update component.

19. A method for updating a reordering model of a statistical machine translation system comprising:
at a first time, receiving new training data, the new training data comprising sentence pairs, each of the sentence pairs comprising a source sentence in a source language and a target sentence in a target language;
extracting phrase pairs from the new training data, each phrase pair including a source language phrase and a target language phrase;
generating a new reordering file from the extracted phrase pairs, the new reordering file including only phrase pairs extracted from the new training data and their associated orientation types;
updating a reordering model of the existing statistical machine translation system based on the new reordering file and an existing reordering table of the reordering model, the existing reordering table comprising phrase pairs and a set of features, the set of features comprising, for each of a set of orientation types, at least one feature which is a function of a count of the orientation type for the respective phrase pair, the updating including accumulating counts of the extracted phrase pairs and stored counts of corresponding phrase pairs in the existing reordering table, each phrase pair in the updated reordering table occurring only once; and repeating the receiving new training data, extracting of phrase pairs, generating of the new reordering file, and the updating the reordering model at least once at a subsequent time, wherein at least one of the extracting phrase pairs, generating the new reordering file, and updating the reordering model is performed with a processor.

\* \* \* \* \*